United States Patent
Wang et al.

(10) Patent No.: US 11,113,793 B2
(45) Date of Patent: Sep. 7, 2021

(54) METHOD AND APPARATUS FOR SMOOTHING A MOTION TRAJECTORY IN A VIDEO

(71) Applicant: Pacific future technology (shenzhen) co., LTD, Shenzhen (CN)

(72) Inventors: Jiali Wang, Shenzhen (CN); Kien Yi Lee, Melaka (MY)

(*) Notice: Subject to any disclaimer, the term of this patent is extended or adjusted under 35 U.S.C. 154(b) by 132 days.

(21) Appl. No.: 16/689,108

(22) Filed: Nov. 20, 2019

(65) Prior Publication Data

US 2021/0150673 A1 May 20, 2021

(51) Int. Cl.
  *G06K 9/00* (2006.01)
  *G06T 5/00* (2006.01)
  *G06T 7/20* (2017.01)

(52) U.S. Cl.
  CPC ............ *G06T 5/002* (2013.01); *G06T 7/20* (2013.01); *G06T 2207/10016* (2013.01); *G06T 2207/20201* (2013.01); *G06T 2207/30241* (2013.01)

(58) Field of Classification Search
  None
  See application file for complete search history.

(56) References Cited

U.S. PATENT DOCUMENTS

| | | | | |
|---|---|---|---|---|
| 2007/0206024 A1* | 9/2007 | Rao | ...................... | G06F 3/0481 345/593 |
| 2008/0112630 A1* | 5/2008 | Nestares | ............ | H04N 5/23248 382/236 |
| 2014/0198852 A1* | 7/2014 | Incesu | .................. | H04N 19/527 375/240.16 |
| 2014/0201666 A1* | 7/2014 | Bedikian | ............ | G06F 3/04815 715/771 |
| 2014/0369555 A1* | 12/2014 | Zhong | .................. | G06K 9/3233 382/103 |
| 2016/0050372 A1* | 2/2016 | Lindner | .................... | G06T 7/33 348/46 |
| 2016/0371817 A1* | 12/2016 | Matsubara | ................ | G06T 7/33 |
| 2017/0053167 A1* | 2/2017 | Ren | ........................... | G06T 3/40 |
| 2017/0064157 A1* | 3/2017 | Lawrence | ............... | G06F 3/147 |
| 2017/0309031 A1* | 10/2017 | Wu | ..................... | G06K 9/00744 |
| 2019/0259214 A1* | 8/2019 | Abdrashitov | ........... | G06T 7/246 |

OTHER PUBLICATIONS

Cao et al. "Adaptive Smoothing Spline for Trajectory Reconstruction", arXiv:1803.07184v2 [stat.ME] Jul. 28, 2018 (Year: 2018).*

* cited by examiner

*Primary Examiner* — Randolph I Chu
(74) *Attorney, Agent, or Firm* — W&K IP

(57) ABSTRACT

Disclosed is a method and apparatus for smoothing a motion trajectory in a video. According to this method, an original rotation matrix sequence of a video frame sequence of an input video is acquired. Then an objective function is determined according to the Riemann manifold architecture, and the smooth rotation matrix that minimizes the objective function is iteratively solved for according to the Riemannian manifold constrained smoothing algorithm, thus obtaining a smooth rotation matrix sequence after the smoothing. Then the video frame sequence is subjected to image stabilization based on the smooth rotation matrix sequence, thereby eliminating motion jitter, making the motion in the video smoother, and improving the video quality.

9 Claims, 5 Drawing Sheets

```
%Smoothing item L2 norm : ||logm (A'*B)|| on the manifold
coeff %Weight of L2 norm
frame_num %number of frames of the video
max_iter_num = 10;% maximum number of iterations
max_dis = 0.11; %maximum manifold distance
cost_value = {}; %value of objective function
%Two parameters beta and sigma required in Armijo search
beta = 0.5;
sigma = 0.1;

for i = 1:max_iter_num

Calculate the gradient
    for j in {1,2,3,...,frame_num}
        cur_new_rot = newrotation(j);
        pre_new_rot = newrotation(j-1);
        next_new_rot = newrotation(j+1);
        old_rot = oldrotation(j);
        grad_f(j) = logm(old_rot'*cur_new_rot) +
    coeff*logm(pre_new_rot'*cur_new_rot) +
    coeff*logm(next_new_rot'*cur_new_rot);
    end %Calculate the Hessian matrix f(x) = 1/2*||dist(p,x)||^2, where p and x are on the SO(3)
    manifold, dist represents the Geodetic distance, which takes ||logm(p,x)|| herein
    Hess (:,j) = Hess_dist(oldrotation(:,j),
    newrotation(:,j)) +coeff*Hess_dist(newrotation(:,j), newrotation(:,j+1))

Calculate the two-metric projecting direction
    Diagonalize the Hessian matrix according to Bertsekas' s Two-Metric Projection
    Algorithm <b style=" font-size: inherit;" >.
    See Dunn' s <b style="font-size: inherit;">paper"a subspace decomposition
    principle for scaled..."
    Hess_grad = so3_hess_refine(Hess_f, grad_f, oldrotation, newrotation, max_dis);

Armijo Linear Search
    temp_fun_cost = inf;
    tangent_inner = 0;
    Calculate the value of the objective function, where cost is the distance between the
    old and new rotation matrices and the smoothness of the new rotation sequence
    old_fun_cost = so3_smooth_fun(newrotation, oldrotation, coeff);
    cost_value = {cost_value, old_fun_cost};
    while old_fun_cost - temp_fun_cost < -sigma*tangent_inner
        alpha = beta^n;
        d = alpha*(Hess_grad);

Update the rotation matrix according to the gradient to obtain a temporary rotation
        matrix
        temprotation = so3_group_update(newrotation, d);
        temp_fun_cost = so3_smooth_fun(temprotation, oldrotation, coeff);
        newrotation = temprotation;

end
```

FIG. 2

METHOD AND APPARATUS FOR SMOOTHING A MOTION TRAJECTORY IN A VIDEO

TECHNICAL FIELD

The present disclosure relates to the technical field of video processing, and more particularly relates to a method and apparatus for smoothing a motion trajectory in a video.

BACKGROUND

Human motion recognition has long been a hot research topic in the fields of computer vision and artificial intelligence, and is widely used in human-computer interaction, behavior description, multimedia applications, and sports science. In the human motion recognition technology a depth camera is typically used to acquire the human body's three-dimensional bone information to recognize the human body motion. However, due to factors such as environmental noise or excessively fast or complex movement of the human body, the recognized three-dimensional bones of the human body may have motion jitter. Therefore, how to eliminate the motion jitter to recover the smooth three-dimensional bone movement of the human body becomes an urgent problem to be solved.

SUMMARY

One main technical problem to be solved by the present disclosure is to provide a method and apparatus for smoothing a motion trajectory in a video, which can eliminate motion jitter and improve video quality.

Embodiments of the present disclosure provide a method for smoothing a motion trajectory in a video, the method including:

obtaining a video frame sequence of an input video, and obtaining an original rotation matrix $R^{old}$ of each video frame;

obtaining an original rotation matrix sequence $x^{old} = [R_1^{old}, R_2^{old}, \ldots, R_n^{old}]^T$ of the video frame sequence that varies with time according to the original rotation matrix $R^{old}$ of each video frame;

assuming a smooth rotation matrix sequence obtained after smoothing the original rotation matrix sequence $x^{old}$ is $x^{new} = [R_1^{new}, R_2^{new}, \ldots, R_n^{new}]^T$, then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$;

determining the objective function based on the Riemann manifold architecture:

$$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

iteratively solving for the smooth rotation matrix $R_n^{new}$ that minimizes the objective function according to the Riemannian manifold constrained smoothing algorithm, and further obtaining the smooth rotation matrix sequence $x^{new}$; and performing image stabilization on the video frame sequence based on the smooth rotation matrix sequence $x^{new}$.

Iteratively solving for the smooth rotation matrix $R_n^{new}$ that minimizes the objective function according to the Riemannian manifold constrained smoothing, algorithm may include iteratively solving for, the smooth rotation matrix $R_n^{new}$ that minimizes the objective function using a steepest gradient descent method to select a direction and using an Armijo rule to select a step size.

The $d_g^2 = (R_n^{old}, R_n^{new})$ may be less than a preset value.

Embodiments of the present disclosure further provide an apparatus for smoothing a motion trajectory in a video, the apparatus including:

a first acquisition module configured for obtaining a video frame sequence of an input video, and obtaining an original rotation matrix $R^{old}$ a each video frame;

a second acquisition module configured for obtaining an original rotation matrix sequence $x^{old} = [R_1^{old}, R_2^{old}, \ldots, R_n^{old}]^T$ of the video frame sequence that varies with time according to the original rotation matrix $R^{old}$ of each video frame;

a determination module, wherein assuming a smooth rotation matrix sequence obtained after smoothing the original rotation matrix sequence $x^{old}$ is $x^{new} = [R_1^{new}, R_2^{new}, \ldots, R_n^{new}]^T$, then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$; the determination module is configured for determining an objective function according to the Riemann manifold architecture:

$$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

a third acquisition nodule configured for iteratively solving for the smooth rotation matrix $R_n^{new}$ that minimizes the objective function according to the Riemannian manifold constrained smoothing algorithm, and further obtaining the smooth rotation matrix sequence $x^{new}$; and a processing module configured for performing image stabilization on the video frame sequence based on the smooth rotation matrix sequence $x^{new}$.

The third acquisition module may be configured for iteratively solving for the smooth rotation matrix $R_n^{new}$ that minimizes the objective function using a steepest gradient descent method to select a direction and using an Armijo rule to select a step size.

The $d_g^2 = (R_n^{old}, R_n^{new})$ may be less than a preset value.

In accordance with the method and apparatus for smoothing a motion trajectory in a video provided by the present disclosure, an original rotation matrix sequence of the video frame sequence of an input video is acquired. Then an objective function is determined, according to the Riemann manifold architecture, and the smooth rotation matrix that minimizes the objective function is iteratively solved for according to the Riemannian manifold constrained smoothing, algorithm, such that a smooth rotation matrix sequence is obtained after the smoothing processing. Then the video frame sequence is subjected to image stabilization based on the smooth rotation matrix sequence, thereby eliminating motion jitter, making the motion in the video smoother and improving the video quality.

BRIEF DESCRIPTION OF DRAWINGS

FIG. 2 is a schematic diagram illustrating partial code that implements the Riemannian manifold constrained smoothing algorithm in accordance with the present disclosure.

DETAILED DESCRIPTION

Technical solutions embodied in the embodiments of this disclosure will now be clearly and comprehensively described in connection with the accompanying drawings for these embodiments. Apparently, the described embodiments are merely some but not all embodiments of this disclosure. All other embodiments obtained by persons of ordinary skill in the art based on the embodiments of this disclosure without making creative efforts shall all fall within the protection scope of the present disclosure.

Figure 1:
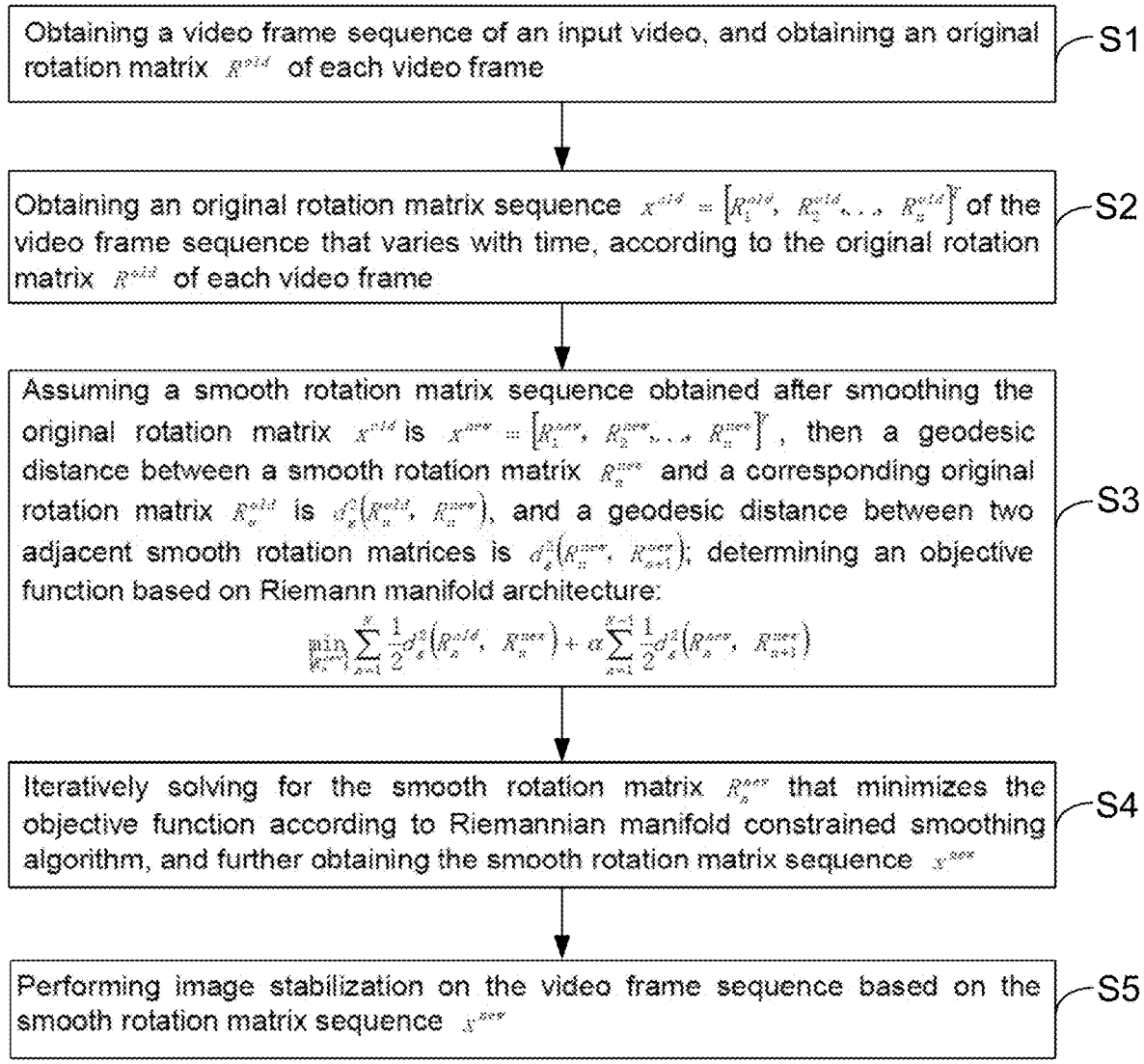
FIG. 1 is a flowchart illustrating a method for smoothing a motion trajectory in a video in accordance with the present disclosure.

Referring to FIG. 1, the method for smoothing a motion trajectory in a video according to this embodiment mainly includes the following operations S1 to S4.

In S1, the method includes obtaining a video frame sequence of an input video, and obtaining an original rotation matrix $R^{old}$ of each video frame.

The input video is a video captured by a camera device, and may include a plurality of video frames, which constitute a sequence of video frames of the input video. Each video frame corresponds to a plurality of three-dimensional rotation matrices, and each of the three-dimensional rotation matrices includes corresponding three-dimensional joint rotation motion information. The original rotation matrix $R^{old}$ representing each video frame is finally generated by multiplying and merging these three-dimensional rotation matrices.

In S2, the method includes obtaining an original rotation matrix sequence $x^{old} = [R_1^{old}, R_2^{old}, \ldots, R_n^{old}]^T$ of the video frame sequence that varies with time according to the original rotation matrix $R^{old}$ of each video frame.

By synthesizing the original rotation matrix $R^{old}$ of each video frame, all the original rotation matrices $R^{old}$ are treated as a whole, thereby obtaining the original rotation matrix sequence $x^{old}$. The original rotation matrix sequence $x^{old}$ corresponds to the original motion trajectory; that is, the original motion trajectory can be depicted using the original rotation matrix sequence $x^{old}$.

In S3, assuming a smooth rotation matrix sequence obtained after smoothing the original rotation matrix sequence $x^{old}$ is $x^{new} = [R_1^{new}, R_2^{new}, \ldots, R_n^{new}]^T$, then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$. The method in this step includes determining an objective function $$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

according the Riemann manifold architecture.

α is a weight parameter for controlling the smoothness of the motion trajectory. The smooth rotation matrix sequence $x^{new}$ corresponds to a smooth motion trajectory after the smoothing processing.

In this embodiment, according to the Riemannian manifold structure, the smoothness of the original rotation matrix sequence $x^{old}$ is defined as the sum of the geodesic distances of the adjacent rotation matrices, and it is ensured that the smooth motion trajectory after smoothing does not deviate too much from the original motion trajectory on the condition that the smooth motion trajectory is as smooth as possible, thus obtaining the objective function $$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

describing the above requirements.

On the manifold basis of Riemann geometry, the geodesic distance is defined as:

$$d_g(R_i, R_j) = \|\log m(R_i^T R_j)\|_F$$

log m( ) is the matrix logarithm operator, and $\|\ \|_F$ is the F norm of the matrix. $R_i$, $R_j$, respectively represent the i-th matrix and the j-th matrix in the matrix sequence.

In S3, the original rotation matrix, sequence $x^{old}$ is directly smoothed on the manifold basis of the Riemannian geometry. According to the geodesic distance $d_g^2(R_n^{old}, R_n^{new})$ defined above, the geodesic distance between the smooth rotation matrix $R_n^{new}$ and the corresponding original rotation matrix $R_n^{old}$, and the geodesic distance $d_g^2(R_n^{new}, R_{n+1}^{new})$ between two adjacent smooth rotation matrices can be determined, thereby determining the objective function.

In S4, the method includes iteratively solving for the smooth rotation matrix $R_n^{new}$ that minimizes the objective function according to the Riemannian manifold constrained smoothing algorithm, and further obtaining the smooth rotation matrix sequence $x^{new}$.

In this embodiment, each smooth rotation matrix $R_n^{new}$ that minimizes the objective function is calculated in an iterative manner, and all the smooth rotation matrices constitute a smooth rotation matrix sequence $x^{new}$.

In calculating the smooth rotation matrix $R_n^{new}$ using the Riemannian manifold constrained smoothing algorithm, the steepest gradient descent method can be used to select a direction, and the Armijo rule can be used to select a step size so as to iteratively solve for the smooth rotation matrix $R_n^{new}$ that minimizes the objective function.

Through the objective function, the original rotation matrix sequence can be effectively smoothed, namely smoothing the original motion trajectory. Further, in order to make the motion trajectory after the smoothing closer to the original motion trajectory such that the human eye is not able to perceive the smooth transition process, $d_g^2(R_n^{old}, R_n^{new})$ is made smaller than a preset value in this embodiment. In other words, the value of $d_g^2 = (R_n^{old}, R_n^{new})$ in the embodiment is rigidly constrained, and the value range of the smooth rotation matrix $R_n^{new}$ that minimizes the objective function is further narrowed by the constraint condition. The preset value is the maximum acceptable value, for example, it may be set to 0.1, or other values can be set according to actual needs, which are not specifically limited.

In one implementation, the partial program code implementing step S4 can be as illustrated in FIG. 2.

In S5, the method includes performing image stabilization on the video frame sequence based on the smooth rotation matrix sequence $x^{new}$.

Thereby, the motion trajectory of the human body can be smoothed, so that the output video is more stable, the motion jitter can be effectively removed, and the human motion in the video is made closer to the actual motion, thereby improving the video quality.

Figure 3:
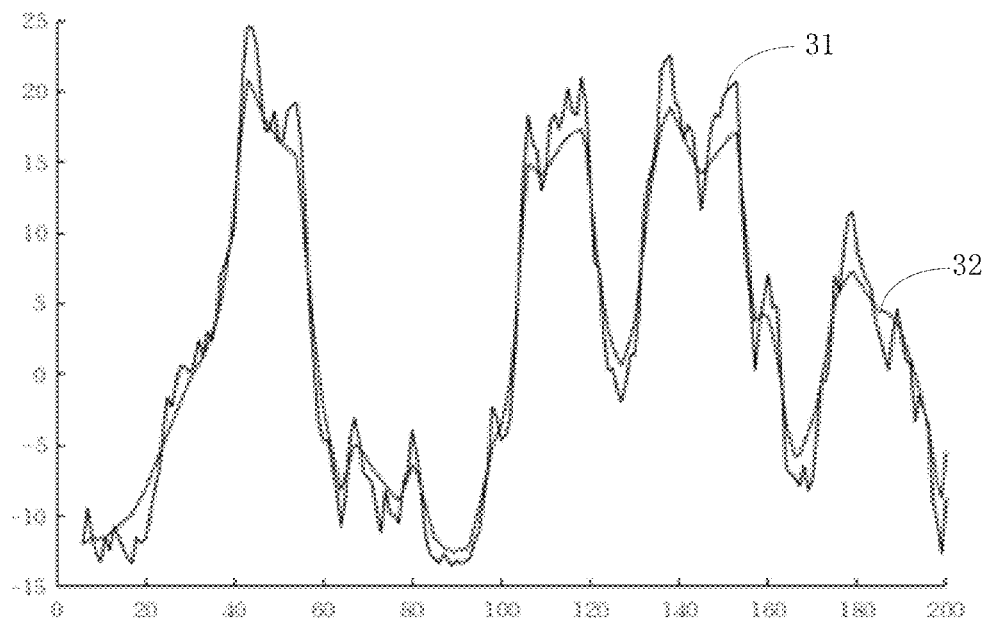
FIG. 3 is a schematic diagram illustrating an original motion trajectory and a smooth motion trajectory in a method for, smoothing motion trajectory in a video in accordance with an embodiment of the present disclosure.
Figure 4:
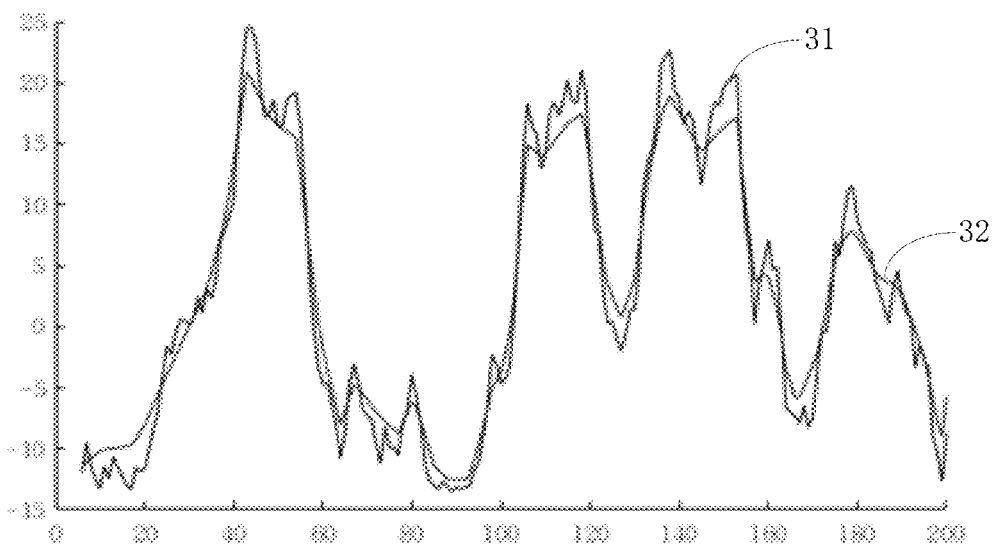
FIG. 4 is another schematic diagram illustrating an original motion trajectory and a smooth motion trajectory in a method for smoothing a motion trajectory in a video in accordance with an embodiment of the present disclosure.
Figure 5:
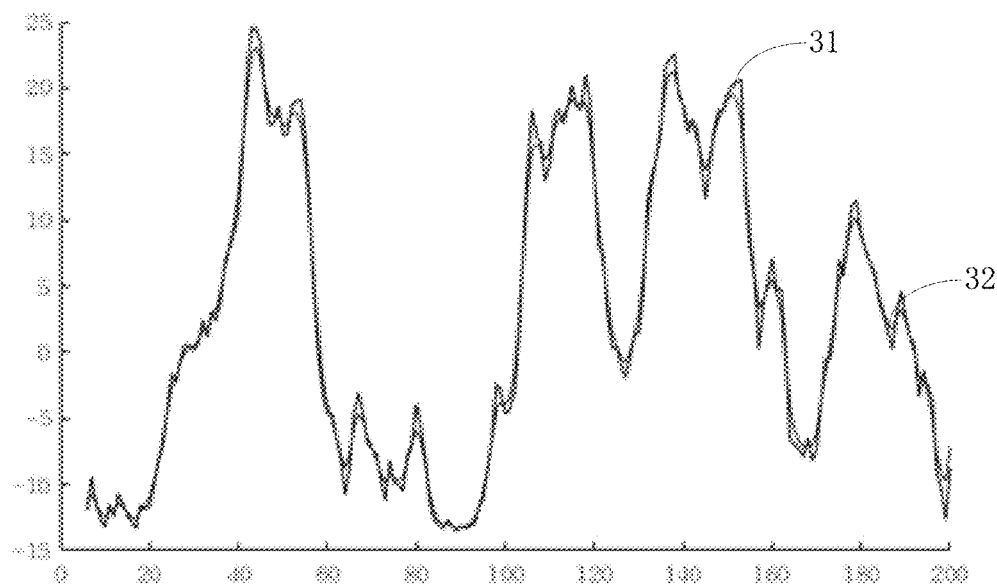
FIG. 5 is yet another schematic diagram illustrating an original motion trajectory and a smooth motion trajectory in a method for smoothing a motion trajectory in a video in accordance with an embodiment of the present disclosure.

Taking the rotation angle of the skeletal wrist part in the x-axis as an example, where the motion trajectory of the skeletal wrist part is smoothed. In the program code illustrated in FIG. 2, coeff is a regression coefficient. Different values of coeff would result in different degrees of smoothness of the smooth motion trajectory after the smoothing, as well as different degrees to which the smooth motion trajectory deviates from the original motion trajectory. As illustrated in FIGS. 3 to 5, which show schematic diagrams of a smooth motion trajectory and an original motion trajectory when the coeff takes values 1000, 200, and 10, respectively, where in these figures the curve 31 represents the original motion trajectory, and the curve 32 represents the smooth motion trajectory after smoothing. As can be seen From the figures, when the coeff takes a relatively larger value, the smooth motion trajectory would have a relatively lower degree of smoothness and a relatively larger degree of deviation from the original motion trajectory. The smaller the coeff value, the smoother the smooth motion trajectory and the closer to the original motion trajectory.

Figure 6:
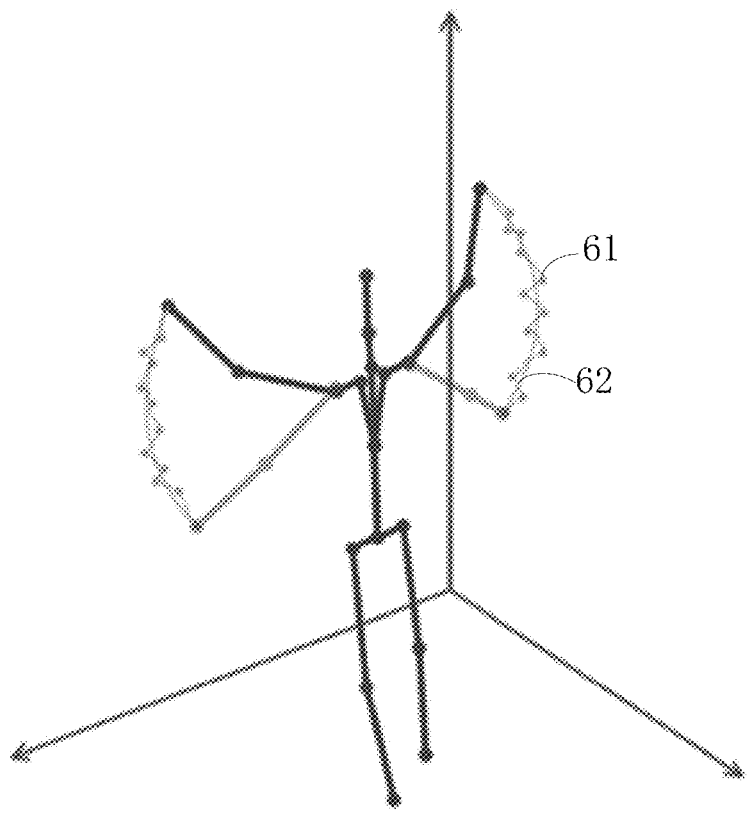
FIG. 6 is a schematic diagram illustrating the effects of a method for smoothing a motion trajectory in a video in accordance with the present disclosure.

Further, the motion trajectory of the skeletal wrist part may be drawn in a three-dimensional human body posture, as illustrated in FIG. 6. In FIG. 6, the motion trajectory 61 depicted as a dot-connected line is the original motion trajectory of the human wrist motion in the three-dimensional bone information. The smooth curve 62 is the smooth motion trajectory after smoothing. Therefore, a smooth motion trajectory can be obtained by the smoothing process according to this embodiment of the present disclosure.

Figure 7:
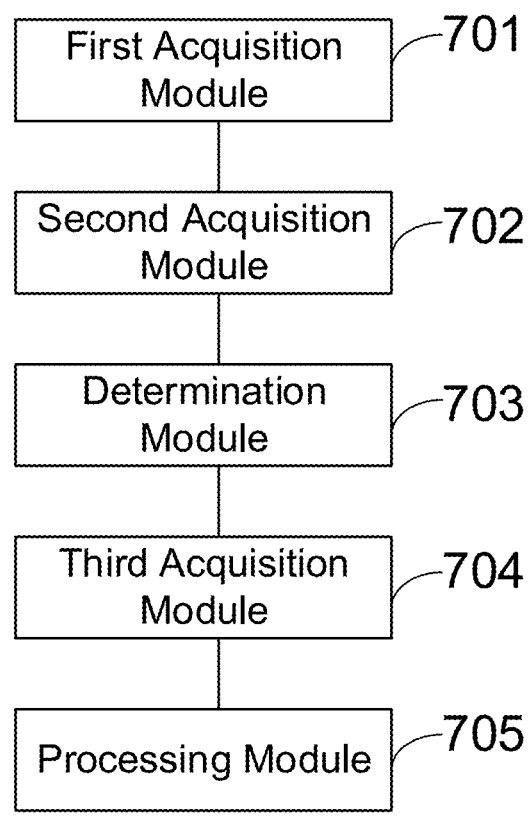
FIG. 7 is a block diagram illustrating an apparatus for smoothing a motion trajectory in a video in accordance with the present disclosure.

Referring now to FIG. 7, the apparatus for smoothing a motion trajectory in a video in accordance with an embodiment of the present disclosure includes a first acquisition module 701, a second acquisition module 702, a determination module 703, a third acquisition module 704, and a processing module 705.

The first acquisition module 701 configured for obtaining a video frame sequence of an input video, and obtaining an original rotation, matrix $R^{old}$ of each video frame.

Each video frame corresponds to a plurality of three-dimensional rotation matrices, and each of the three-dimensional rotation matrices includes corresponding three-dimensional joint rotation motion information. The original rotation matrix $R^{old}$ representing each video frame is finally generated by multiplying and merging these three-dimensional rotation matrices.

The second acquisition module 702 is configured for obtaining an original rotation matrix sequence $x^{old} = [R_1^{old}, R_2^{old}, \ldots, R_n^{old}]^T$ of the video frame sequence that varies with time according to the original rotation matrix $R^{old}$ of each video frame.

By synthesizing the original rotation matrix $R^{old}$ each video frame, all the original rotation matrices $R^{old}$ are treated as a whole, thereby obtaining the original rotation matrix sequence $x^{old}$. The original rotation matrix sequence $x^{old}$ corresponds to the original motion trajectory; that is, the original motion trajectory can be depicted using the original rotation matrix sequence $x^{old}$.

The determination module 703 is configured for determining an objective function. Assuming a smooth rotation matrix sequence obtained after smoothing the original rotation matrix sequence $x^{old}$ is $x^{new} = [R_1^{new}, R_2^{new}, \ldots, R_n^{new}]^T$, then a geodesic distance between, a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$. Thus, an objective function $$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

can be determined according to the Riemann manifold architecture.

α is a weight parameter for controlling the smoothness of the motion trajectory.

On the manifold basis of Riemann geometry, the geodesic distance is defined as:

$$d_g(R_i, R_j) = \|\log m(R_i^T R_j)\|_F$$

log m( ) is the matrix logarithm operator, and $\| \|_F$ is the F norm of the matrix. $R_i$, $R_j$ respectively represent the i-th matrix and the j-th matrix in the matrix sequence.

In this embodiment the original rotation matrix sequence $x^{old}$ is directly smoothed on the manifold basis of the Riemannian geometry. According to the geodesic distance defined above, the geodesic distance $d_g^2 R(R_n^{old}, R_n^{new})$ between the smooth rotation matrix $R_n^{new}$ and the corresponding original rotation matrix $R_n^{old}$, and the geodesic distance $d_g^2(R_n^{new}, R_{n+1}^{new})$ between two adjacent smooth rotation matrices can be determined, thereby determining the objective function.

The third acquisition module 704 is configured for, iteratively solving for the smooth rotation matrix $R_n^{new}$ that minimizes the objective function according to the Riemannian manifold constrained smoothing algorithm, and further obtaining the smooth rotation matrix sequence $x^{new}$.

In this embodiment, each smooth rotation matrix $R_n^{new}$ that minimizes the objective function is calculated in an iterative manner, and all the smooth rotation matrices constitute a smooth rotation matrix sequence $x^{new}$.

Further, in calculating the smooth rotation matrix $R_n^{new}$ using the Riemannian manifold constrained smoothing algorithm, the steepest gradient descent method can be used to select a direction, and the Armijo rule can be used to select a step size so as to iteratively solve for the smooth rotation matrix $R_n^{new}$ that minimizes the objective function.

Through the objective function, the original rotation matrix sequence can be effectively smoothed, namely smoothing the original motion trajectory. Further, in order to make the motion trajectory after the smoothing closer to the actual motion trajectory, $d_g^2 = (R_n^{old}, R_n^{new})$ is made smaller than a preset value in this embodiment. In other words, the value of $d_g^2 = (R_n^{old}, R_n^{new})$ in the embodiment is rigidly constrained. The preset value is the maximum acceptable value and can be set according to actual needs, which are not specifically limited.

The processing module 705 is configured for performing image stabilization on the video frame sequence based on the smooth rotation matrix sequence $x^{new}$.

By this embodiment, the motion trajectory of the human body can be smoothed, so that the output video is more stable, the motion jitter can be effectively removed, and the human motion in the video is made closer to the actual motion, thereby improving the video quality.

The foregoing description merely illustrates some illustrative embodiments of the disclosure and is not intended as limiting the patentable scope of the disclosure. Any equivalent structural or flow transformations that are made taking advantage of the disclosure and that are used directly or indirectly in other related technical fields shall all fall in the scope of protection of the present disclosure.

What is claimed is:

1. A method for smoothing a motion trajectory in a video, comprising:
    obtaining a video frame sequence of an input video, and obtaining an original rotation matrix $R^{old}$ of each video frame;
    obtaining an original rotation matrix sequence $x^{old}=[R_1^{old}, R_2^{old}, \ldots, R_n^{old}]^T$ of the video frame sequence that varies with time, according to the original rotation matrix of each video frame $R^{old}$;
    assuming a smooth rotation matrix sequence obtained after smoothing the original rotation matrix $x^{old}$ is $x^{new}=[R_1^{new}, R_2^{new}, \ldots, R_n^{new}]^T$, then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$;
    determining an objective function based on Riemann manifold architecture:

$$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

iteratively solving for the smooth rotation matrix $R_n^{new}$ that minimizes the objective function according to Riemannian manifold constrained smoothing algorithm, and further obtaining the smooth rotation matrix sequence $x^{new}$; and
    performing image stabilization on the video frame sequence, based on the smooth rotation matrix sequence $x^{new}$.

2. The method of claim 1, wherein iteratively solving for the smooth rotation matrix $R_n^{new}$ that minimizes the objective function according to the Riemannian manifold constrained smoothing algorithm comprises:
    iteratively solving for the smooth rotation matrix $R_n^{new}$ that minimizes the objective function using a steepest gradient descent method to select a direction and using an Armijo rule to select a step size.

3. The method of claim 2, wherein $d_g^2(R_n^{old}, R_n^{new})$ is less than a preset value.

4. An apparatus for smoothing a motion trajectory in a video, comprising:
    a first acquisition module, configured for obtaining a video frame sequence of an input video, and obtaining an original rotation matrix $R^{old}$ of each video frame;
    a second acquisition module, configured for obtaining an original rotation matrix sequence $x^{old}=[R_1^{old}, R_2^{old}, \ldots, R_n^{old}]^T$ of the video frame sequence that varies with time, according to the original rotation matrix of each video frame $R^{old}$;
    a determination module, wherein assuming a smooth rotation matrix sequence obtained after smoothing the original rotation matrix $x^{old}$ is $x^{new}=[R_1^{new}, R_2^{new}, \ldots, R_n^{new}]^T$ then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth rotation matrices is $d_g^2(R_n^{new}, R_{n+1}^{new})$; the determination module is configured for determining an objective function according to Riemann manifold architecture:

$$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

a third acquisition module, configured for iteratively solving for the smooth rotation matrix $R_n^{new}$ that minimizes the objective function according to Riemannian manifold constrained smoothing algorithm, and further obtaining the smooth rotation matrix sequence $x^{new}$; and
    a processing module, configured for performing image stabilization on the video frame sequence based on the smooth rotation matrix sequence $x^{new}$.

5. The apparatus of claim 4, wherein the third acquisition module is configured for iteratively solving for the smooth rotation matrix $R_n^{new}$ that minimizes the objective function using a steepest gradient descent method to select a direction and using an Armijo rule to select a step size.

6. The apparatus of claim 5, wherein $d_g^2(R_n^{old}, R_n^{new})$ is less than a preset value.

7. A non-transitory computer readable storage medium, storing at least one instruction, which when executed on one or more processors is configured to perform a method for smoothing a motion trajectory in a video, the method comprising the following operations:
    obtaining a video frame sequence of an input video, and obtaining an original rotation matrix $R^{old}$ of each video frame;
    obtaining an original rotation matrix sequence $x^{old}=[R_1^{old}, R_2^{old}, \ldots, R_n^{old}]^T$ of the video frame sequence that varies with time, according to the original rotation matrix of each video frame $R^{old}$;
    assuming a smooth rotation matrix sequence obtained after smoothing the original rotation matrix $x^{old}$ is $x^{new}=[R_1^{new}, R_2^{new}, \ldots, R_n^{new}]^T$, then a geodesic distance between a smooth rotation matrix $R_n^{new}$ and a corresponding original rotation matrix $R_n^{old}$ is $d_g^2(R_n^{old}, R_n^{new})$, and a geodesic distance between two adjacent smooth, rotation matrices is $d_g^2(R_n^{new}, R_{n+1}^{new})$;
    determining an objective function based on Riemann manifold architecture:

$$\min_{\{R_n^{new}\}} \sum_{n=1}^{N} \frac{1}{2} d_g^2(R_n^{old}, R_n^{new}) + \alpha \sum_{n=1}^{N-1} \frac{1}{2} d_g^2(R_n^{new}, R_{n+1}^{new})$$

iteratively solving for the smooth rotation matrix $R_n^{new}$ that minimizes the objective function according to Riemannian manifold constrained smoothing algorithm, and further obtaining the smooth rotation matrix sequence $x^{new}$; and performing image stabilization on the video frame sequence based on the smooth rotation matrix sequence $x^{new}$.

8. The non-transitory computer readable storage medium of claim 7, wherein iteratively solving for the smooth rotation matrix $R_n^{new}$ that minimizes the objective function according to the Riemannian manifold constrained smoothing algorithm comprises:

iteratively that solving for the smooth rotation matrix $R_n^{new}$ that minimizes the objective function using a steepest gradient descent method to select a direction and using an Armijo rule to select a step size.

9. The non-transitory computer readable storage medium of claim 8, wherein $d_g^2 = (R_n^{old}, R_n^{new})$ is less than a preset value.

* * * * *